May 27, 1958  J. PINSKY ET AL  2,836,318
COATED PLASTIC ARTICLES
Filed Aug. 13, 1957

INVENTORS
Albert E. Adakonis
Alvin R. Nielsen
and Jules Pinsky
BY Burns, Doane, Benedict & Irons
ATTORNEYS

United States Patent Office 2,836,318
Patented May 27, 1958

2,836,318
COATED PLASTIC ARTICLES

Jules Pinsky, West Hartford, Albert E. Adakonis, East Hartford, and Alvin R. Nielsen, Hartford, Conn., assignors to Plax Corporation, Bloomfield, Conn., a corporation of Delaware Application August 13, 1957, Serial No. 677,999

20 Claims. (Cl. 215—1)

This invention relates generally to synthetic resin articles and more particularly to synthetic resin articles, such as sheets, bottles and containers, which have enhanced resistance to permeation by fluids. More specifically, the invention is directed to plastic articles, such as polyethylene containers and bottles, a surface of which is modified by application of a coating thereto to prevent or reduce the rate of permeation of the synthetic resin material by many of the commonly encountered fluids, particularly organic liquids.

Synthetic resin containers and bottles as, for example, polyethylene bottles, have become widely popular as a packaging means for various liquids such as deodorants, hair preparations, cosmetic preparations, medicinal preparations, and the like. In particular, polyethylene has been and is widely used in the production of squeeze bottles for the distribution of such preparations in that it is relatively inert, has the necessary flexibility to function as a squeeze bottle, and can be easily fabricated in quantity at a reasonable cost. Unmodified polyethylene is entirely satisfactory for a wide variety of materials. However, polyethylene and other synthetic resins which are usable as containers are permeable to many organic liquids, including a large number of conventional organic solvents which are widely used in fluid preparations for which the polyethylene bottle or container is highly desirable. Representative chemicals, for example, which permeate with various degrees of rapidity through polyethylene at room temperature, include the straight chain hydrocarbons, the aromatic hydrocarbons, esters, ketones, and various other non-polar fluids. Consequently, because of this high permeability characteristic of polyethylene and other synthetic resin materials from which containers are desirably fabricated, the use of these materials has of necessity been restricted to those products to which the resin is substantially impermeable. The permeability characteristics of polyethylene with respect to certain of these chemicals has resulted in polyethylene bottles being rejected for use in applications where, due to its flexibility and ease of fabrication, it might otherwise be employed to great advantage.

It has previously been suggested that polyethylene bottles be lined with such materials as polyvinyl alcohol, polyvinyl chloride and copolymers of polyvinyl chloride and polyvinyl acetate to obtain an oil resistant film which will resist permeation by oily materials. While such liners have been moderately successful, there is currently no known liner material which will form a flexible coating on a polyethylene surface and which will resist permeation by a wide variety of organic fluids such as toluene, hexane, carbon tetrachloride, ethyl acetate, and the like.

In view of the problems as above set forth relating to the use of synthetic resin containers and bottles, particularly those produced from polyethylene, it is a primary object of this invention to provide a plastic article which is characterized by enhanced resistance to permeation by a variety of fluids.

It is another object of this invention to provide a container or bottle formed from a synthetic resin, a surface of which carries a flexible coating which will prevent permeation of the resinous container structure by a variety of commonly employed organic fluids.

It is an additional object of this invention to provide a polyethylene bottle having a flexible, resinous coating on the interior and/or exterior surface thereof which is characterized by enhanced resistance to permeation by a variety of organic fluids, particularly the common hydrocarbon solvents.

It is another object of the present invention to provide a polyethylene bottle having a flexible, adherent, synthetic resin coating which is substantially impermeable to many organic fluids capable of substantially permeating the polyethylene bottle walls in the absence of such coating.

A further object of the invention is a lined container or bottle formed from a synthetic resin, preferably polyethylene, which is highly flexible and usable in "squeeze bottle" applications without deleterious effect on the container or bottle to retain organic fluids without objectionable loss due to their permeation of the container or bottle.

In co-pending application Serial No. 574,383, filed March 28, 1956, and of which the present application is a continuation-in-part, it is disclosed that excellent resistance to permeation of synthetic resinous containers by a variety of commonly employed organic fluids may be obtained by lining and/or coating the surface thereof with a cured epoxy resin. Containers, and particularly polyethylene bottles coated or lined with cured epoxy resin compositions, have proved highly successful as containers for such organic fluids as carbon tetrachloride, toluene, ethyl acetate, acetone, benzene, oils and compositions containing such materials. While these coated or lined containers have generally exhibited requisite flexibility for many commercial applications, the increased use of squeeze bottles, especially as dispensers for cosmetics, medicants, air fresheners, cleaning fluids, household lubricants, and the like, make it desirable to employ a liner characterized by maximum flexibility without adversely effecting the resistance of the lined container to fluid permeation.

In accordance with the present invention, it has now been discovered that liners and coatings of enhanced flexibility and having excellent resistance to permeation by a wide variety of organic fluids may be obtained by a particular combination of epoxy resins with a hardener. Generally described, the present invention comprises a synthetic resin article having a surface characterized by enhanced resistance to permeation by fluids, said surface having a coating of the cured mixture of:

A. an epoxy resin composition containing from about 90% to about 10% by weight of the reaction product of epichlorhydrin, p,p'dihydroxy-diphenyldimethyl methane and epihydric alcohol and from about 10% to about 90% of the reaction product of epichlorhydrin and dimethyl, p-hydroxydiphenyl, p-hydroxy-o-(p-hydroxybenzyl) phenyl methane; and B. 3,4 - epoxy - 6 - methyl cyclohexylmethyl - 3,4 - epoxy-6-methylcyclohexane carboxylate, said A and B being admixed in a ratio of between about 1:1 and about 75:1. It has been found that if the limiting ranges in A and the limiting ratios between A and B are not observed, the desired high flexibility and low permeation characteristics are not obtained. Preferably a ratio of between 10:1 and 50:1 will be employed.

In a more specific embodiment the invention comprises a synthetic resinous container, such as a bottle, carton, tube or the like, a surface of which has a coating of the cured epoxy resin composition of the invention. In its preferred embodiment the invention comprises a polyethylene bottle, a surface of which has a coating of the cured epoxy resin composition of the invention.

Any of the conventional hardeners may be employed to cure the epoxy resin composition of the invention. Epoxy resins may be readily hardened or cured to an insoluble, infusible state by reaction of the epoxy and hydroxyl groups with cross-linking agents including diamines or polyamines, such as metaphenylene diamine, diethylene triamine and the polyethylene polyamines; diisocyanates, such as methylene bis-(4-phenyl)isocyanate; dialdehydes such as glyoxal; dimercaptans; and amides and polyamides, such as those disclosed in U. S. Patent No. 2,705,223. Preferably, the epoxy resin mixture of the invention will be cured by a hardener admixed therewith in a ratio between about 2:1 and about 10:1 by weight. Particularly desirable curable mixtures will contain epoxide and hardener in a ratio of between about 4:1 and about 6:1 by weight. The coatings applied to the synthetic resin surfaces in accordance with this invention are the cured or hardened epoxy resins obtained by reaction of the particular admixture of epoxides of the invention with a hardener or cross-linking agent for epoxy resins.

It is often desirable to chemically pretreat the plastic substrate to render the material more receptive to polar compounds and thus promote enhanced adherence of the coating or lining material. In U. S. Reissue Patent 24,062 to Horton, it is disclosed that improved adherence of polar compounds to polyethylene may be effected by treating the surface to be printed, lined or coated with a solution of sulfuric acid and a dichromate. U. S. Patents 2,715,075, 2,715,076 and 2,715,077 to Wolinski disclose that desired surface modification may be obtained by flame treating the surface to be printed, coated or lined, such as shown in U. S. Patents 2,632,921 and 2,704,382 to Kreidl. All of these treatments involve the oxidation of the plastic surface and, in many instances, the conversion of an initially hydrophobic surface to a hydrophilic surface. However, hydrophobic resinous surfaces may also be rendered more receptive to polar compounds by sulfonation or chlorination.

Thus the degree of adherency of the coatings or liners to the articles or containers of the invention will vary depending on the nature of the substrate being coated. The coating applied to untreated polyethylene and other normally hydrophobic materials in accordance with the invention is adherent in the sense that the coating clings to the substrate when applied and does not separate during normal usage to a degree deleteriously affecting the resistance to permeation of the coated or lined surface. Where for reasons of optimum performance and/or appearance a more strongly adherent coating or liner may be desired, suitable surface pretreatment preferably will be employed.

The epoxy resin of the invention is preferably applied to the surface to be lined or coated in an uncured state, dissolved in a suitable solvent such as toluene, methyl ethyl ketone, and the like. The coating may be applied by conventional techniques, such as by spraying, or manually by at least partially filling the bottle followed by suitable manipulative and draining steps to insure the application of an even coating to the interior surface. If the coating is applied to the exterior surface of the article, it need simply be immersed in a bath of the coating material and allowed to drain. Exterior coatings may, of course, be applied by spraying techniques. Where the coatings of the invention are applied by spray techniques, it is especially desirable to chemically pretreat the substrate and thus insure enhanced continuity and adhesion of the coating. The cured coating or lining is then produced in situ by subjecting the coated article to a curing temperature for a period of time necessary to produce the desired chemical reaction. Desirably, the coating will be cured at a temperature of 190–220° F. for a period of at least a half hour. Shorter periods of time may obviously be employed with higher curing temperatures. The curing time and temperature will also be varied by the amount and type of catalyst or hardening agent employed. If desired, the lined or coated objects may be allowed to stand for an extended period, e. g., twenty-four to seventy-two hours at room temperature prior to being cured at higher temperature, thus reducing the time required for the advanced temperature curing operation. The softening point of the plastic being coated generally constitutes the upper limit of the curing temperature and for unmodified polyethylene this upper limit is about 220° F.

In the accompanying drawing illustrative embodiments of the invention are presented.

Figure 1:
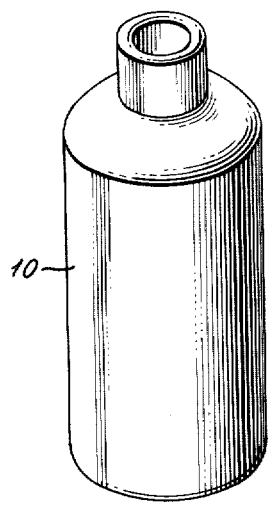
Figure 1 is an elevational view of a conventional Boston round polyethylene bottle 10 which has not been modified in accordance with the invention.
Figure 2:
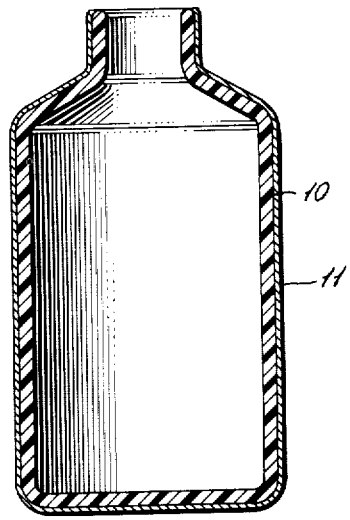
Figure 2 is a sectional view of a similar polyethylene bottle 10 having a continuous external coating 11 of the cured epoxy resin composition of the invention.
Figure 3:
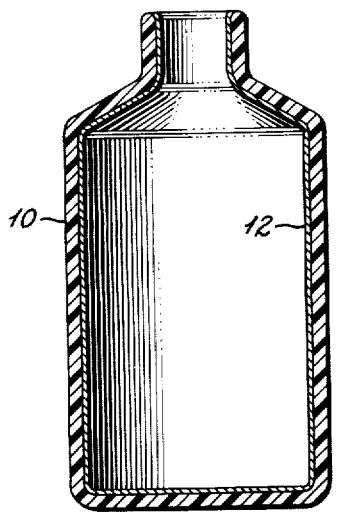
Figure 4:
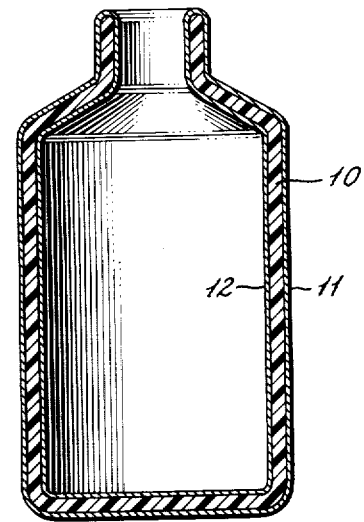

Figure 3 is a sectional view of a similar polyethylene bottle 10 having a continuous internal lining 12 of the cured epoxy resin composition of the invention; and Figure 4 is a sectional view of a similar polyethylene bottle 10 having both a continuous exterior coating 11 and a continuous interior lining 12 of the cured epoxy resin composition of the invention.

Having generally described the invention, the following examples are presented for purposes of illustrating various specific embodiments thereof. For purposes of brevity in the examples, the epoxy resins employed in accordance with the invention will be referred to as epoxy resin A or B as identified below.

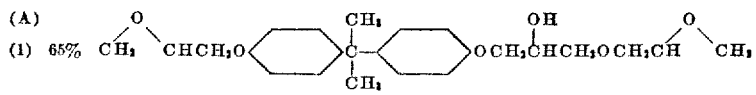

(A reaction product of epichlorhydrin, p,p'dihydroxy diphenyl dimethyl methane and epihydric alcohol)

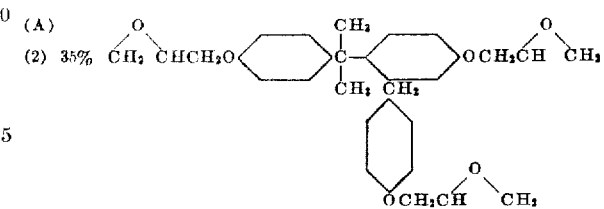

(A reaction product of epichlorhydrin and dimethyl, p-hydroxy phenyl, p-hydroxy-o-(p-hydroxy benzyl) phenyl methane)

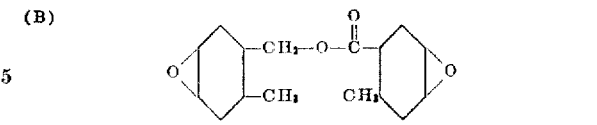

(3,4-epoxy-6-methyl cyclohexylmethyl-3,4-epoxy-6-methyl-cyclohexane carboxylate)

Similarly, the preferred hardener or cross-linking agent employed in the samples also will be referred to as hardener C. It will be understood, however, that other hardeners or cross-linking agents as referred to hereinabove and as known to the art as hardeners or cross-linking agents for epoxide resins may be substituted for hardener C. Hardener C is identified below.

(C) 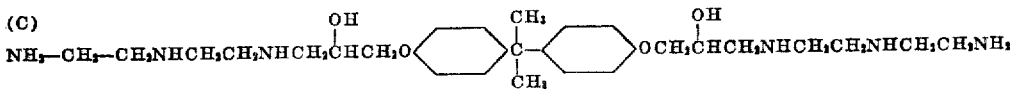

The inner surfaces of all the lined polyethylene bottles employed in the examples were treated prior to lining to oxidize the surfaces and thus render them more receptive to polar compounds. In all cases, the lined bottles prepared as in the examples could be flexed repeatedly as in squeeze bottle operation without deleterious effect on the liner or the permeability characteristics of the bottle. Unless otherwise indicated, all parts are by weight.

EXAMPLE I

Thirty-four parts of resin A were admixed with one part of resin B. Four parts of this mixture were then mixed with one part hardener C and the final mixture was diluted with methyl ethyl ketone to a solids content of about 65%. Four ounce Boston round polyethylene bottles were lined manually by the pour-in, pour-out technique and the linings were cured at 190° F. for 120 minutes. The liners averaged 1.16 grams per bottle. These were filled with hexane, toluene, ethyl acetate, and carbon tetrachloride, respectively, and stored at 73° F. for 286 days. The average weight losses determined for the coated bottles and unlined control bottles are expressed in grams/day/bottle at various intervals shown in the table below:

*Weight loss—grams per day per bottle*

|  | Unlined— 286 Days | Lined | | |
|---|---|---|---|---|
|  |  | 32 Days | 157 Days | 286 Days |
| n-Hexane | 2.2 | 0.0047 | 0.0064 | 0.0061 |
| Toluene | 2.79 | 0.002 | 0.0034 | 0.0046 |
| Ethyl Acetate | 0.095 | 0.0058 | 0.0046 | 0.0046 |
| Carbon Tetrachloride | 3.49 | 0.0075 | 0.0111 | 0.0118 |

EXAMPLE II

Forty parts of resin A were admixed with one part of resin B. Four parts of this admixture were then mixed with one part of hardener C and the final mixture diluted with methyl ethyl ketone to a solids content of 57%. Four ounce Boston round bottles were lined manually as in Example I. Half of the bottles were double lined. These were merely drained before relining. All of the bottles were cured at 190° F. for 90 minutes. The average weight of the double linings was 0.350 gram per bottle and the single lining 0.250 gram per bottle. The bottles were filled with the indicated test fluid and stored at 73° F. for 283 days. The average weight losses in grams per day per bottle were:

employed fluids. Moreover, the coated surfaces of the invention are additionally beneficial in preventing passage of gases, such as oxygen, through the plastic substrate. Consequently, synthetic resin, and particularly polyethylene, containers and bottles may be satisfactorily employed as containers for such materials or compositions containing these materials when the containers are lined with a cured epoxy resin in accordance with the present invention.

The enhanced flexibility of the cured liners as compared to those specifically disclosed in the parent application is most unexpected. It normally would be postulated that introduction of a molecule having such closely spaced epoxy groups would result, upon cross-linking, in an inflexible cured resin.

It is often beneficial to irradiate the lining or coating solution during the curing procedure. Not only does irradiation accelerate the normal cross-linking reaction but often effects a graft polymerization whereby the epoxy and/or hardening agent is chemically combined with the substrate, thus greatly enhancing the adherence of the coating or lining to the substrate.

Although in the examples particular emphasis has been placed on the popular polyethylene bottle, it is also within the scope of the invention that coatings and/or linings of the cured epoxy resin composition of the invention be employed with other synthetic resinous articles which are permeable to organic fluids such as carbon tetrachloride, hexane, acetone, benzene, toluene, and the like. The invention is broadly applicable to plastic articles or containers fabricated from all types of thermo-plastic or thermo-setting resins. More specifically, the invention is applicable to articles or containers fabricated from such materials as polyethylene, including conventional polyethylene and the so-called new type low temperature polyethylene, such as Ziegler polyethylene, polymethylene or polyethylene substantially free of branched chains, polyethylene terephthalate, polytetrafluoroethylene, nylon, acetate copolymers, ethylenepolyvinyl acetate copolymers, coumarone resins; indene resins; acetylene polymers, including their halogenated derivatives; polymers of olefin hydrocarbons other than ethylene, including polymers of isoprene, butadiene and their homologues, and halogen-substituted derivatives thereof; olefin-sulfur dioxide resins; phenol-aldehyde resins; aldehyde resins; furfural resins; ketone resins; urea-formaldehyde type resins; including thiourea-formaldehyde, melamine formaldehyde, and dicyandiamide-formaldehyde resins; amine-aldehyde resins; sulfonamide-aldehyde resins; nitro resins; resins from such nitrogen containing materials as hydrazine and related substances, pyrazoles, pyridine, quinoline, pyrrole, indole and carbazole, con-

*Weight loss—grams per day per bottle*

|  | Unlined | Double Lined | | | Single Lined | | |
|---|---|---|---|---|---|---|---|
|  |  | 28 Days | 150 Days | 283 Days | 28 Days | 150 Days | 283 Days |
| n-Hexane | 2.2 | 0.0043 | 0.0069 | 0.0101 | 0.0058 | 0.0087 | 0.0090 |
| Toluene | 2.79 | 0.0053 | 0.0077 | 0.0116 | 0.0065 | 0.0092 | 0.0104 |
| Ethyl Acetate | 0.095 | 0.0040 | 0.0038 | 0.0040 | 0.0040 | 0.0047 | 0.0048 |
| Carbon Tetrachloride | 3.49 | 0.0060 | 0.0121 | 0.0137 | 0.0096 | 0.0168 | 0.020 |

From the foregoing examples, it is apparent that the coating of the surface or the lining of a container or bottle with the cured epoxy resin composition of the invention will result in greatly decreased permeation of the article or container by many of the commercially densation polyester resins, including resins obtained from polyhydric alcohols and polybasic acids, and from hydroxy acids; polyamide resins and derivatives thereof; mixed polyester-polyamide resins; polyether resins; polyvinyl ethers; polyvinyl alcohols; polyvinyl esters; rubber and its derivatives; cellulose esters and cellulose ethers. All of these plastic materials may be used with any of the usual modifying agents including plasticizers, pigments, fillers, dyes and materials which combine chemically with the polymer ingredients either during formation of the polymer or during an after treatment. Thus, surfaces and containers fabricated from copolymers, interpolymers and mixtures of polymers may be advantageously rendered less permeable to organic fluids by application of a coating or lining of a cured epoxy resin.

As indicated, containers or bottles may, in accordance with the invention, be coated or lined on either the interior or exterior surfaces or both. Where the problem involved is merely the prevention of moisture from entering the product to be packaged or to prevent gases from the atmosphere from contacting the contents of the container, an external impermeable coating is satisfactory. However, from the standpoint of the permeation of a liquid within a container outwardly through the container walls, it is greatly preferred to employ an interior lining or coating. Moreover, with an external coating, an ingredient of the fluid content may be essential, although quantitatively small, and consequently such ingredient may be lost by absorption in the container wall even though the ingredient does not escape from the bottle itself. This latter situation is especially important where the containers are employed for skin lotions, perfumes, foods, medicants, beverage, and the like, in which the essential oil fraction governing the perfume odor is relatively small. Accordingly, despite the proportionally greater difficulty of applying a lining to the container's interior, the advantages of such an inner lining are such that it is preferred. In some instances it may be desirable to apply both an interior and exterior lining.

The mechanical methods of applying the coating or lining to the container surfaces are well known to the art and do not constitute a part of the present invention. Specific details of the operation and functioning of spray coating units may be found in Paasche Patents 2,547,884, 2,059,706 and 2,069,844.

Since modifications of the disclosed invention will be apparent to those skilled in the art, it is intended that the invention be limited only by the scope of the appended claims.

This application is a continuation-in-part of application Serial No. 574,383, filed March 28, 1956.

What is claimed is:

1. A synthetic resin article having a surface characterized by enhanced resistance to permeation by fluids, said surface having a coating of the cured mixture of:

A. an epoxy resin composition containing from about 90% to about 10% by weight of the reaction product of epichlorhydrin, p,p'dihydroxy - diphenyldimethyl methane and epihydric alcohol and from about 10% to about 90% of the reaction product of epichlorhydrin and dimethyl, p-hydroxydiphenyl, p-hydroxy-o-(p-hydroxybenzyl) phenyl methane; and B. 3,4-epoxy-6-methyl cyclohexylmethyl-3,4 - epoxy - 6 - methylcyclohexane carboxylate, said A and B being admixed in a weight ratio of between about 1:1 and about 75:1.

2. An article according to claim 1 in which the epoxy resins are cured by a polyamine.

3. An article according to claim 1 in which the epoxy resins are cured by a polyamine admixed with the said resins in a ratio of between 1:2 and 1:10 by weight.

4. An article according to claim 1 in which the epoxy resins are cured by a bis-phenyl polyamine admixed with the said resins in a ratio of between 1:2 and 1:10 by weight.

5. A polyethylene container having a surface characterized by enhanced resistance to permeation by organic fluids, said surface having a coating of the cured mixture of:

A. an epoxy resin composition containing from about 90% to about 10% by weight of the reaction product of epichlorhydrin, p,p'dihydroxy - diphenyldimethyl methane and epihydric alcohol and from about 10% to about 90% of the reaction product of epichlorhydrin and dimethyl, p-hydroxydiphenyl, p-hydroxy-o-(p-hydroxybenzyl) phenyl methane; and B. 3,4-epoxy-6-methyl cyclohexylmethyl-3,4 - epoxy - 6 - methylcyclohexane carboxylate, said A and B being admixed in a ratio of between about 1:1 and about 75:1.

6. A container according to claim 5 in which the epoxy resins are cured by a polyamine.

7. A container according to claim 5 in which the epoxy resins are cured by a polyamine admixed with the said resins in a ratio of between 1:2 and 1:10 by weight.

8. A container according to claim 5 in which the epoxy resins are cured by a bis-phenyl polyamine admixed with the said resins in a ratio of between 1:2 and 1:10 by weight.

9. A polyethylene bottle of increased resistance to permeation by organic fluids, at least one surface thereof having an adherent coating of the cured mixture of:

A. an epoxy resin composition containing from about 90% to about 10% by weight of the reaction product of epichlorhydrin, p,p'dihydroxy - diphenyldimethyl methane and epihydric alcohol and from about 10% to about 90% of the reaction product of epichlorhydrin and dimethyl, p-hydroxydiphenyl, p-hydroxy-o-(p-hydroxybenzyl) phenyl methane; and B. 3,4-epoxy-6-methyl cyclohexylmethyl-3,4 - epoxy - 6 - methylcyclohexane carboxylate, said A and B being admixed in a ratio of between about 1:1 and about 75:1.

10. A bottle according to claim 9 in which the epoxy resins are cured by a polyamine.

11. A bottle according to claim 9 in which the epoxy resins are cured by a polyamine admixed with the said resins in a ratio of between 1:2 and 1:10 by weight.

12. A bottle according to claim 9 in which the epoxy resins are cured by a bis-phenyl polyamine admixed with the said resins in a ratio of between 1:2 and 1:10 by weight.

13. A bottle according to claim 9 in which the coating is on the exterior surface.

14. A bottle according to claim 9 in which the coating is on the interior surface.

15. A polyethylene container of increased resistance to permeation by organic fluids comprising a chemically pretreated surface receptive to polar compounds, said surface having a strongly adherent coating of the cured mixture of:

A. an epoxy resin composition containing from about 90% to about 10% by weight of the reaction product of epichlorhydrin, p,p'dihydroxy - diphenyldimethyl methane and epihydric alcohol and from about 10% to about 90% of the reaction product of epichlorhydrin and dimethyl, p-hydroxydiphenyl, p-hydroxy-o-(p-hydroxybenzyl) phenyl methane; and B. 3,4-epoxy-6-methyl cyclohexylmethyl-3,4 - epoxy - 6 - methylcyclohexane carboxylate, said A and B being admixed in a ratio of between about 1:1 and about 75:1.

16. A container according to claim 15 in which the epoxy resins are cured by a polyamine.

17. A container according to claim 15 in which the epoxy resins are cured by a polyamine admixed with the said resins in a ratio of between 1:2 and 1:10 by weight.

18. A container according to claim 15 in which the epoxy resins are cured by a bis-phenyl polyamine admixed with the said resins in a ratio of between 1:2 and 1:10 by weight.

19. A container according to claim 15 in which the coating is on the exterior surface.

20. A container according to claim 15 in which the coating is on the interior surface.

References Cited in the file of this patent

UNITED STATES PATENTS

| | | |
|---|---|---|
| 2,444,333 | Castan | June 29, 1948 |
| 2,491,947 | Bardash | Dec. 20, 1949 |
| 2,811,468 | Joffre | Oct. 29, 1957 |

UNITED STATES PATENT OFFICE
Certificate

Patent No. 2,836,318                                                                              Patented May 27, 1958

Jules Pinsky, Albert E. Adakonis, and Alvin R. Nielsen

Application having been made by Jules Pinsky, Albert E. Adakonis, and Alvin R. Nielsen, the inventors named in the patent above identified; and Plax Corporation, Bloomfield, Connecticut, a corporation of Delaware, the assignee, for the issuance of a certificate under the provisions of Title 35, Section 256, of the United States Code, deleting the name of the said Albert E. Adakonis as a joint inventor, and a showing and proof of facts satisfying the requirements of the said section having been submitted, it is this 3rd day of December 1968, certified that the name of the said Albert E. Adakonis is hereby deleted from the said patent as a joint inventor with the said Jules Pinsky and Alvin R. Nielsen.

EDWIN L. REYNOLDS,
*First Assistant Commissioner of Patents.*

[SEAL]

UNITED STATES PATENT OFFICE
Certificate

Patent No. 2,836,318 Patented May 27, 1958

Jules Pinsky, Albert E. Adakonis, and Alvin R. Nielsen

Application having been made by Jules Pinsky, Albert E. Adakonis, and Alvin R. Nielsen, the inventors named in the patent above identified; and Monsanto Company, a corporation of Delaware, the assignee, for the issuance of a certificate under the provisions of Title 35, Section 256, of the United States Code, deleting the name of the said Albert E. Adakonis as a joint inventor, and a showing and proof of facts satisfying the requirements of the said section having been submitted, it is this 8th day of April 1969, certified that the name of the said Albert E. Adakonis is hereby deleted from the said patent as a joint inventor with the said Jules Pinsky and Alvin R. Nielsen.

This certificate supersedes the certificate issued under 35 U.S.C. 256 on December 3, 1968.

[SEAL]

EDWIN L. REYNOLDS,
*First Assistant Commissioner of Patents.*